US006291790B1

(12) United States Patent
Nakai et al.

(10) Patent No.: US 6,291,790 B1
(45) Date of Patent: Sep. 18, 2001

(54) WIRE ELECTRODE FOR ELECTRO-DISCHARGE MACHINING

(75) Inventors: Yoshihiro Nakai; Hitoshi Kishida; Naoyuki Ookubo; Kazuhiro Nanjo; Yasuo Murayoshi; Masatada Numano; Yasuyuki Otsuka, all of Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/638,395

(22) Filed: Aug. 15, 2000

(30) Foreign Application Priority Data

Sep. 6, 1999  (JP) .................................................. 11-251581
Jun. 15, 2000  (JP) .................................................. 12-179986

(51) Int. Cl.$^7$ ...................................................... B23H 1/00
(52) U.S. Cl. ..................................... 219/69.12; 219/69.11; 219/69.15
(58) Field of Search ............................. 219/69.12, 69.11, 219/69.15; 428/607; 420/469

(56) References Cited

U.S. PATENT DOCUMENTS

| 4,341,939 | * | 7/1982 | Briffod et al. ..................... 219/69 W |
| 4,968,867 | * | 11/1990 | Banzai et al. ..................... 219/69.12 |
| 5,599,633 | * | 2/1997 | Miyazaki et al. ..................... 428/675 |
| 5,808,262 | * | 9/1998 | Mukherjee ........................ 219/69.12 |

FOREIGN PATENT DOCUMENTS

850716 * 7/1998 (EP) ................................ B23H/7/08

* cited by examiner

*Primary Examiner*—M. Alexandra Elve
(74) *Attorney, Agent, or Firm*—Smith, Gambrell & Russell, LLP

(57) ABSTRACT

The present wire electrode for wire electro-discharge machining includes a core and a plurality of coating layers covering the outer peripheral surface of the core. The core and the plurality of coating layers are formed of different materials, and each of coating layers is made of a metal or a metal alloy including the metal selected from the group consisting of Cu, Sn, Ag, Al, Zn, Cs, Se, Te, Mg, Bi, Ti, P, In, Cr, and Fe.

7 Claims, No Drawings

WIRE ELECTRODE FOR ELECTRO-DISCHARGE MACHINING

BACKGROUND OF THE INVENTION

1. Field of the Invention

The present invention relates to an improvement of a wire electrode used for electro-discharge machining.

2. Description of the Background Art

Wire electro-discharge machining is a method of melting and cutting a workpiece into a desired configuration by causing intermittent discharge between a workpiece and a linear working electrode referred to as a wire electrode for electro-discharge machining via a working liquid such as water or oil and by moving the workpiece relative to the wire electrode for electro-discharge machining. This method is utilized for manufacturing various types of metal molds and the like. Such wire electro-discharge machining requires processing characteristics such as excellent finish of a workpiece, high process accuracy, good finished surface condition of the workpiece, no wire electrode material adhesion to the workpiece, and a short electro-discharge machining time. A brass wire, having good drawability and high strength required for a wire electrode, is generally used as a wire electrode for such wire electro-discharge machining.

In recent years, as improvements and advancements are made on working power sources, a need exists for a wire electrode that can improve processing speed and accuracy. In particular, a wire electrode that allows improved processing speed and accuracy is desired for applications employing a power source of a wire electro-discharge machining apparatus that repeatedly applies a high and short-time pulse voltage.

Conventional wire electrodes for electro-discharge machining prepared from a brass wire, however, are incapable of attaining a sufficiently high processing speed. Further, brass wires are problematic in that large amount of electrode material adheres to the workpiece, that the cut surface of the workpiece is roughened, and that the wire electrode is easily broken when electro-discharge machining is attempted at a high processing speed.

Moreover, some applications use a wire electrode for wire electro-discharge machining prepared by covering a core formed of Cu or a Cu alloy with Zn, or that, after covering with Zn, heat treated to produce a Cu—Zn alloy at a surface layer by diffusion and thus having an oxide film on the outermost surface. The former Zn-coated Cu or Cu alloy wire electrode results in improved cut surface of the workpiece; however, it cannot provide a sufficiently high processing speed. On the other hand, the latter diffusion alloy-coated wire electrode improves the processing speed to some extent, but the property of the cut surface of the workpiece is not sufficiently improved. It is also difficult to position the latter wire electrode prior to the start of electro-discharge machining. As compared with the brass wire, although the conventional wire electrode for wire electro-discharge machining having a core and a coating layer formed on an outer periphery of the core affords improved electro-discharge machining characteristics, the wire electrode itself, a wire contact (a roller or die for feeding electricity), a guide die and the like suffer wear and undergo considerable damage so that their lifetimes are shortened, which significantly increases the cost of electro-discharge machining.

SUMMARY OF THE INVENTION

Hence, an object of the present invention is to provide at a low cost a wire electrode for wire electro-discharge machining that reduces the electro-discharge machining time, suppresses electrode material adhesion to the workpiece, and provides a smoothly cut workpiece surface. Another object of the present invention is to provide a wire electrode for wire electro-discharge machining that can be easily positioned, does not reduce the lifetime of a wire contact and a guide die, and thus reduces the overall cost of electro-discharge machining.

According to the present invention, the wire electrode for wire electro-discharge machining includes a core and a plurality of coating layers covering the outer peripheral surface of the core, wherein the core and the plurality of coating layers are formed of different materials, and each of coating layers is made of a metal or a metal alloy including a metal selected from the group consisting of Cu, Sn, Ag, Al, Zn, Cs, Se, Te, Mg, Bi, Ti, P, In, Cr, and Fe. The wire electrode for wire electro-discharge machining including a plurality of coating layers made of such specific materials has excellent electro-discharge machining characteristics (in other words, has improved electro-discharge machining speed, reduced material adhesion to the cut surface of the workpiece, and thus a smoothly cut workpiece surface), and particularly, shows such excellent characteristics in electro-discharge machining where a high and short-time pulse voltage is repeatedly applied.

In addition, a first coating layer directly in contact with the outer peripheral surface of the core is preferably made of a Cu—Zn alloy. Moreover, the outermost layer of the plurality of coating layers is preferably made of Zn. Further, from the viewpoint of conductivity and workability of the wire electrode, it is preferred that at least the surface layer of the core is made of copper or a copper alloy.

According to the present invention, in addition to the plurality of coating layers made of different metals or alloys in the above-described wire electrode, at least one coating layer other than the outermost layer may additionally include a discontinuous coating layer including a compound of a nitride, an oxide, or a carbide. Inclusion of such additional discontinuous compound coating layer facilitates suppression of a localized concentrated discharge and allows a fine and highly frequent discharge to be maintained with ease. Moreover, since the outermost layer of the plurality of coating layers is formed of a metal or an alloy, the compound coating layer generally having a high degree of hardness does not aggravate wear and damage of the wire contact, the guide die and the like to shorten their lifetimes, and the positioning of the wire electrode prior to the start of electro-discharge machining can be facilitated. Furthermore, when the outermost layer of the plurality of coating layers is formed of a metal or an alloy, the outermost layer, at the time of discharge, can easily be vaporized, acting to inhibit the rise in the temperature of the wire electrode so that a high-speed electro-discharge machining becomes possible without causing the wire electrode to break even under severe electro-discharge machining conditions.

Preferably, the wire electrode is subjected to plastic working with area reduction rate (reduction rate in the cross sectional area) in the range of about 40% to about 99% after the plurality of coating layers are formed or after the final heat treatment after the formation of the plurality of coating layers. Here, the possible techniques of plastic working include roll working, wire drawing, or the like. Plastic working with the area reduction rate of less than 40% does not afford sufficient improvement in the tensile strength of the wire electrode, while plastic working with the area reduction rate exceeding 99% is not preferable in that the high-temperature strength of the wire electrode is lowered, resulting in frequent breaking of the wire electrode during electro-discharge machining. The area reduction rate in the plastic working is expressed by the following equation:

$$\text{Area reduction rate } (\%) = \frac{d_1^2 - d_2^2}{d_1^2} \times 100$$

where $d_1$ is the wire diameter before processing; and $d_2$ is the wire diameter after processing.

The wire electrode preferably has a tensile strength of 70 kg/mm² or greater and has a conductivity satisfying the relation of $(\sqrt{\text{tensile strength}}) \times (\text{conductivity})^3/10^5 \geq 1.2$, since a wire electrode having the tensile strength of less than 70 kg/mm² frequently breaks during electro-discharge machining, while the sufficient electro-discharge machining speed cannot be attained with a wire electrode having a low conductivity.

The wire electrode preferably has a wire diameter and an average total coating layer thickness that satisfy the relation represented by $20 \geq (\text{average total coating layer thickness}) \times 100/(\text{wire diameter}) \geq 5$. The total thickness of all the coating layers that is too great lowers the high-temperature strength of the wire electrode, making the wire electrode easily breakable during electro-discharge machining, whereas the total coating layer thickness that is too small keeps the sufficient electro-discharge machining speed from being achieved. Here, the average total coating layer thickness refers to the average thickness value for the total thickness from the first coating layer directly in contact with the outer peripheral surface of the core to the outermost coating layer.

Moreover, the material composition may change sharply or gradually at the interfaces of the above plurality of coating layers.

The foregoing and other objects, features, aspects and advantages of the present invention will become more apparent from the following detailed description of the present invention.

DESCRIPTION OF THE PREFERRED EMBODIMENTS

Various embodiments according to the present invention will be described below.

First Embodiment

A Cu-20% Zn core of 8 mm diameter, a Cu-40% Zn pipe of 9 mm inner diameter and 11 mm outer diameter, and an Ag pipe of 12 mm inner diameter and 13 mm outer diameter are combined by a pipe fitting technique using a clamping die and wire-drawn to produce a wire electrode having a Cu-20% Zn/Cu-40% Zn/Ag structure. In the drawing process of this wire electrode, softening heat treatment is performed for an appropriate number of times at 450° C. or below to facilitate drawing, and after the final heat treatment, plastic working with the area reduction rate of 95.7% is effected.

Second Embodiment

A Cu-30% Zn core of 8 mm diameter and a Cu-40% Zn pipe of 9 mm inner diameter and 11 mm outer diameter are combined by the pipe fitting technique and wire-drawn to form a wire of 1.0 mm diameter. At this time, softening heat treatment is performed for an appropriate number of times at 450° C. or below to facilitate drawing. An Sn layer is formed by electroplating on the surface of this composite wire of 1.0 mm diameter, and thereafter, plastic working with the area reduction rate of 93.8% is effected to form a wire electrode having a Cu-30% Zn/Cu-40% Zn/Sn structure.

Third Embodiment

A Cu-35% Zn core of 0.7 mm diameter is passed through Zn vapor twice to produce a composite wire having a Cu-35% Zn/Cu-45% Zn/ Cu-50% Zn structure. Then, this composite wire is subjected to plastic working with the area reduction rate of 90% to form a wire electrode.

Fourth Embodiment

A Cu-coated steel wire core of 0.6 mm diameter is passed through Mg vapor, is then coated with a Zn layer by electroplating, and thereafter, is subjected to plastic working with the area reduction rate of 85% to produce a wire electrode having a steel/Cu-30% Mg/Zn structure.

Fifth Embodiment

A Cu-10% Zn core of 8 mm diameter, a Cu-38% Zn pipe of 9 mm inner diameter and 11 mm outer diameter, an Al pipe of 12 mm inner diameter and 13 mm outer diameter, and a Zn pipe of 13.5 mm inner diameter and 14.5 mm outer diameter are combined by the pipe fitting technique and are wire-drawn to produce a wire electrode having a Cu-10% Zn/Cu-38% Zn/Al/Zn structure. In this case, softening heat treatment is performed for an appropriate number of times at 350° C. or below to facilitate drawing, and after the final heat treatment, plastic working with the area reduction rate of 95.7% is effected.

Sixth Embodiment

A Cu-0.3% Sn core of 8 mm diameter, a Cu-40% Zn pipe of 9 mm inner diameter and 11 mm outer diameter, and a Ti pipe of 12 mm inner diameter and 13 mm outer diameter are combined by the pipe fitting technique and are wire-drawn to the diameter of 0.75 mm to produce a wire electrode having a Cu-0.3% Sn/Cu-40% Zn/Ti structure. This composite wire is heat treated in a nitrogen gas atmosphere of about 450° C. to form a TiN layer, a Zn layer is formed thereon by electroplating, and plastic working with the area reduction rate of 90% is effected to produce a wire electrode having a Cu-0.3% Sn/Cu-40% Zn/(TiN-containing)/Zn structure.

Seventh Embodiment

A Cu-20% Zn core of 0.8 mm diameter is passed through Zn vapor to produce a composite wire having a Cu-20% Zn/Cu-46% Zn structure. A composite oxide layer of Cu and Zn is formed by oxidizing the surface of this composite wire while the composite wire is left exposed to the air to cool for a short period of time. The composite oxide layer at this time is an island-like discontinuous layer having a thickness of about 50 nm in the region where the layer is the thickest. The composite wire with the composite oxide layer is passed through Zn vapor once again to form a Cu-46% Zn layer on the discontinuous oxide layer, and then, a Zn-plated layer is formed thereon. Thereafter, plastic working with the area reduction rate of 92.3% is performed to produce a Cu-20% Zn/Cu-46% Zn/ (composite oxide of Cu and Zn)/Cu-46% Zn/Zn structure. In this case, the composite oxide layer is brittle so that it becomes a discontinuous coating layer that is further finely segmented by plastic working after the formation of the Zn-plated layer.

Eighth Embodiment

A Cu-20% Zn core of 0.8 mm diameter is passed through Zn vapor to produce a Cu-20% Zn/Cu-46% Zn composite wire. A Zn layer is formed by electroplating on the surface of this composite wire, and thereafter, plastic working with the area reduction rate of 92.3% is effected to form a wire electrode having a Cu-20% Zn/Cu-46% Zn/Zn structure.

Conventional Example

A Cu-35.1% Zn wire electrode, without a coating layer, for electro-discharge machining as one example of a conventional wire electrode has been adopted for the comparison with the present wire electrode.

Table 1 summarizes the structures and the characteristics of a wire electrode for electro-discharge machining obtained in the above-described manner according to the present invention and that of the conventional example. In addition, after plastic working, the produced wire electrodes are subjected to a light heat treatment by electric conduction in order to straighten the wires otherwise curled or twisted as a result of plastic working. The wire electrodes finally produced according to the present embodiments all are found to have superior straightness and smooth surfaces.

The wire electrodes shown in Table 1 were mounted on a wire electro-discharge machining apparatus and electro-discharge machining was performed under the same conditions. A study was made on such aspects as the electro-discharge machining speed, the amount of electrode material adhesion to the cut surface of the workpiece, cut surface properties of the workpiece, the number of instances of electrode breakage, and ease of automatic threading (that is, the ease with which a broken wire end is automatically inserted back into the guide die) at times of such breakage. The results are as reported in Table 2 below. Here, the electro-discharge machining speed derived from the processed cross sectional area per unit time (product of feeding speed times the thickness of the workpiece), and is indicated as a ratio normalized by the electro-discharge machining speed of the conventional electrode. Moreover, the amount of wire material adhesion to the cut surface of the workpiece is also given as a relative ratio, with the amount of wire material adhesion in the conventional example at 100. Furthermore, the SKD-11 material according to the JIS (Japanese Industrial Standard) standard was used as the workpiece, whose thickness was 60 mm.

TABLE 2

| No. | Ratio of processing speed | Workpiece Amount of adhesion | Surface property | No. of breakage | Ease of automatic threading |
|---|---|---|---|---|---|
| Present embodiments | | | | | |
| 1 | 1.44 | 72 | A | 0 | Good |
| 2 | 1.42 | 61 | A | 0 | Good |
| 3 | 1.59 | 64 | A | 0 | Good |
| 4 | 1.43 | 65 | A | 0 | Good |

TABLE 1

| No. | Core material | Wire diameter d (mm $\phi$) | No. of layers | First layer | Second layer | Third layer | Fourth layer | Tensile strength $\sigma$ (kg/mm$^2$) | Conductivity $\Sigma$ (% IACS) | $\sqrt{\sigma} \times \Sigma^3 / 10^5$ | Total coating layer thickness $\alpha$ ($\mu$m) | ($\alpha$/d) $\times$ 100 |
|---|---|---|---|---|---|---|---|---|---|---|---|---|
| Present embodiments | | | | | | | | | | | | |
| 1 | Cu-20% Zn | 0.25 | 2 | Cu-40 Zn | Ag | — | — | 105 | 31 | 3.1 | 21 | 8.4 |
| 2 | Cu-30% Zn | 0.25 | 2 | Cu-40 Zn | Sn | — | — | 98 | 28 | 2.2 | 16 | 6.4 |
| 3 | Cu-35% Zn | 0.25 | 2 | Cu-45 Zn | Cu-50 Zn | — | — | 85 | 26 | 1.6 | 29 | 11.6 |
| 4 | Cu-coated steel wire | 0.25 | 2 | Cu-30 Mg | Zn | — | — | 95 | 24 | 1.3 | 35 | 14 |
| 5 | Cu-10% Zn | 0.25 | 3 | Cu-38 Zn | Al | Zn | — | 102 | 33 | 3.6 | 42 | 16.8 |
| 6 | Cu-0.3% Sn | 0.25 | 3 | Cu-40 Zn | TiN | Zn | — | 84 | 65 | 25.2 | 24 | 9.6 |
| 7 | Cu-20% Zn | 0.25 | 4 | Cu-46 Zn | Composite oxide of Cu and Zn | Cu-46 Zn | Zn | 84 | 29 | 2.2 | 24 | 9.6 |
| 8 | Cu-20% Zn | 0.25 | 2 | Cu-46 Zn | Zn | — | — | 86 | 29 | 2.3 | 25 | 10.0 |
| Conventional example | | | | | | | | | | | | |
| 1C | Cu- | 0.25 | 0 | — | — | — | — | 112 | 21 | 1.0 | 0 | 0 |

TABLE 2-continued

| No. | Ratio of processing speed | Workpiece Amount of adhesion | Surface property | No. of breakage | Ease of automatic threading |
|---|---|---|---|---|---|
| 5 | 1.37 | 60 | A | 0 | Good |
| 6 | 1.61 | 70 | A | 0 | Good |
| 7 | 1.61 | 61 | A | 0 | Good |

TABLE 2-continued

| No. | Ratio of processing speed | Workpiece Amount of adhesion | Surface property | No. of breakage | Ease of automatic threading |
|---|---|---|---|---|---|
| 8 Conventional example | 1.57 | 63 | A | 0 | Good |
| 1C | 1.00 | 100 | C | 2 | Good |

Surface property A: excellent (surface was very smooth and free of any dimensional error in direction of thickness)
Surface property B: good (surface was smooth with no substantial dimensional error in direction of thickness)
Surface property C: poor (surface was somewhat rough and small dimensions error was found in direction of thickness)

As seen from Tables 1 and 2, the wire electrode for electro-discharge machining according to the present invention, when compared with the conventional wire electrode, has greatly improved electro-discharge machining characteristics (processing speed, cut surface of the workpiece, etc.) and affords great ease of automatic threading. Although the above-described embodiments offer no illustration of a wire electrode including a carbide-containing layer as a compound-containing layer, the same effects can be achieved by the wire electrode including a carbide-containing layer in place of the nitride-containing layer or the oxide-containing layer of the above description.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A wire electrode for wire electro-discharge machining, comprising:
   a core including an outer peripheral surface;
   a plurality of coating layers covering the outer peripheral surface of said core, wherein:
   (a) said core and said plurality of coating layers are formed of different materials, and
   (b) each of the coating layers is made of a metal or a metal alloy including a metal selected from the group consisting of Cu, Sn, Ag, Al, Zn, Cs, Se, Te, Mg, Bi, Ti, P, In, Cr, and Fe; and
   wherein, in addition to the coating layers made of said metal or said metal alloy, said wire electrode further includes at least one layer, other than an outermost layer of the wire electrode, which is a discontinuous layer including a compound selected from the group consisting of a nitride, an oxide, and a carbide.

2. The wire electrode for wire electro-discharge machining according to claim 1, wherein a first coating layer directly in contact with the outer peripheral surface of said core is made of a Cu-Zn alloy.

3. The wire electrode for wire electro-discharge machining according to claim 1, wherein an outermost layer of said plurality of coating layers is made of Zn.

4. The wire electrode for wire electro-discharge machining according to claim 1, wherein at least the outer peripheral surface of said core is made of copper or a copper alloy.

5. The wire electrode for wire electro-discharge machining according to claim 1, wherein plastic working is effected with an area reduction rate in a range of 40% to 99% after formation of said plurality of coating layers or after final heat treatment after the formation of said plurality of coating layers.

6. The wire electrode for wire electro-discharge machining according to claim 1, wherein said wire electrode has a tensile strength of at least 70 kg/mm$^2$ and has a conductivity satisfying: $(\sqrt{\text{tensile strength}}) \times (\text{conductivity})^3/10^5 \geq 1.2$.

7. The wire electrode for wire electro-discharge machining according to claim 1, wherein said wire electrode has a wire diameter and an average total coating layer thickness that satisfy: $20 \geq (\text{average total coating layer thickness}) \times 100/(\text{wire diameter}) \geq 5$.

* * * * *